United States Patent [19]

Dimitracopoulos

[11] 3,840,977
[45] Oct. 15, 1974

[54] METHOD OF MAKING MOLDS FOR MOLDING OR CASTING OPTICAL PARTS AND THE LIKE

[76] Inventor: Panayotis C. Dimitracopoulos, P.O. Box 458 Outremont, Montreal 154 Quebec, Canada

[22] Filed: May 8, 1973

[21] Appl. No.: 358,273

[52] U.S. Cl............... 29/460, 29/527.2, 29/527.4, 425/17.5, 425/808
[51] Int. Cl.......................... B23p 3/00, B23p 19/04
[58] Field of Search ....... 29/460, 423, 527.2, 527.4; 425/175, 808, 472; 264/1

[56] References Cited
UNITED STATES PATENTS

| 2,319,014 | 5/1943 | Smith | 264/1 |
| 3,365,790 | 1/1968 | Brauer | 29/460 X |
| 3,526,949 | 9/1970 | Genovese | 29/460 X |
| 3,555,126 | 1/1971 | Gitson | 425/808 X |

FOREIGN PATENTS OR APPLICATIONS

| 12,793 | 7/1964 | Japan | 425/808 |

Primary Examiner—C. W. Lanham
Assistant Examiner—Victor A. DiPalma

[57] ABSTRACT

A method for making molds for molding or casting optical parts and the like, whereby a hole is pierced through two plates, this hole closely following a selected contour of the pattern of the mold-cavity, the pattern snuggly fitted inside this hole, and plating or electroplating the assembly, then separating the two plates and removing the pattern.

12 Claims, 7 Drawing Figures

PATENTED OCT 15 1974     3,840,977

METHOD OF MAKING MOLDS FOR MOLDING OR CASTING OPTICAL PARTS AND THE LIKE

FIELD OF INVENTION

This invention relates to methods for producing molds employed for the molding or casting of precision parts such as optical parts and the like.

DESCRIPTION OF PRIOR ART

The method employed in the manufacturing of optical parts, such as lenses and prisms, is well known in the art, and briefly consists of cutting or casting optical glass into the approximate desired shape and size, followed by a series of laborious, expensive and time-consuming steps of grinding, polishing and inspecting. Highly skilled labour is employed for these steps as well as considerable machinery, equipment and checking and inspecting instruments. All these account for the high cost of optical parts, and therefore it has become more and more tempting to substitute optical glass with plastics. Plastics easily lend themselves to the various injection-molding and casting techniques, and therefore plastic lenses and plastic optical parts find increasingly more uses in cameras, projectors, field-glasses and optical instruments in general.

Since plastics must be molded or cast in special molds, appropriate metal molds are manufactured by means of the various well known metal-working machinery and techniques. Invariably, molds have the negative (or more correctly, the enantiomorphic) shape of the article they will eventually produce, and thus the mold-making process is a very costly process requiring very high skill.

On the other hand one could theoretically use an actual sample or a very precise prototype of the part to be molded, and by employing plating (such as electroplating) techniques, produce an extremely accurate mold. But since the plating process will entirely surround the sample with a plating layer, it would be necessary to somehow slice it, or cut it, in two, or more parts, in order to extricate the sample and expose a cavity which could then be used for casting or molding. It is evident that this is impractical and it will also somewhat alter the shape and size of the cavity (for example the cutting process will result in the removal of some material, after which, further material will have to be removed in an additional polishing or grinding operation).

OBJECTS OF THE INVENTION

It is therefore the object of this invention to provide a method whereby molds of the highest quality and accuracy can be produced by means of plating techniques.

It is a further object to produce such molds in a very economical manner.

It is a further object to produce such molds without having to slice or cut the plating layer in order to extricate the "pattern" and thereby expose the cavity.

It is a still further object to produce such molds whereby the "pattern" may actually be an actual sample or precision prototype, which after use in making the mold according to the teachings of the invention, may be recovered intact and undamaged.

It is a still further object of this invention to produce such molds whereby the separation of the mold in two or more parts, (as required for the easy and convenient removal or ejection of the molded or cast part) is arranged or fabricated prior to the plating process, whereby greatly simplifying the mold-making process and significantly reducing its cost.

It is a still further object to provide such molds having convenient and accurate realignment means, fabricated or machined in their two or more parts, prior to the plating process. Other objects of the invention will become evident from the ensuing description, illustrations and claims.

Summary

A method for making molds such as those employed for molding or casting optical parts and precision parts, according to which: two plates are held together, a hole is pierced through both of them (this hole closely following a chosen contour of the pattern of the mold cavity), the pattern is snuggly fitted inside this hole, and at least the pattern (or a part of the pattern) and a portion of the walls of the hole are plated so that the plating layer adheres firmly on the walls of the hole. Thereafter the two plates are separated, the pattern removed, thereby exposing a mold cavity which follows exactly the size and shape of the pattern.

DESCRIPTION OF THE PREFERRED EMBODIMENTS

Embodiment No. 1

Figure 1:
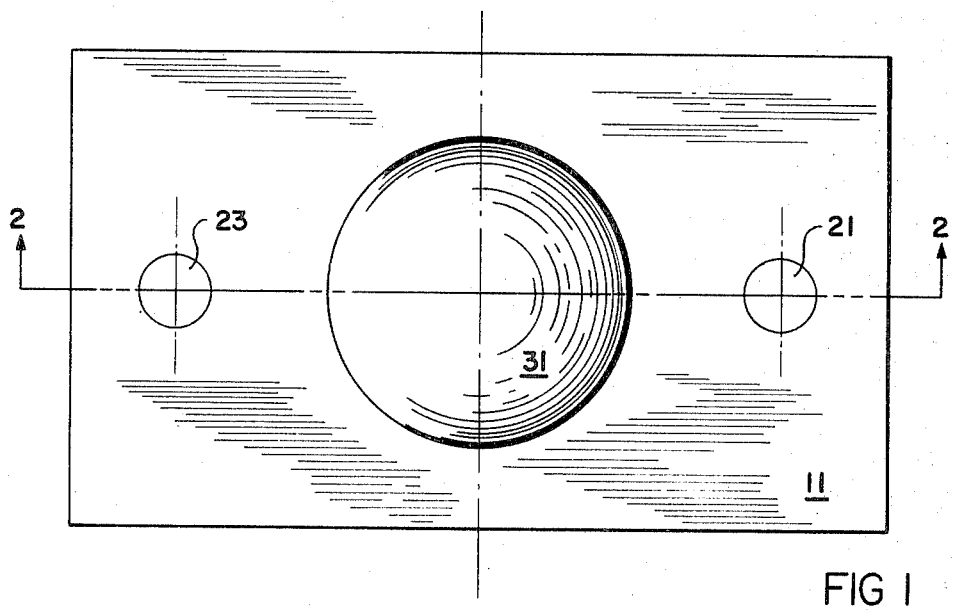
FIG. 1 is a plan view of typical plates employed in a preferred embodiment of the invention, with a lens fitted in a hole of the plates.
Figure 2:
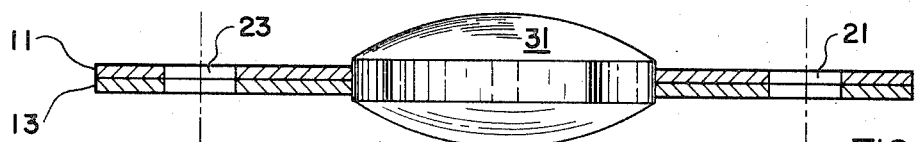
FIG. 2 is a cross-sectional view taken along line 2—2 of FIG. 1.
Figure 3:
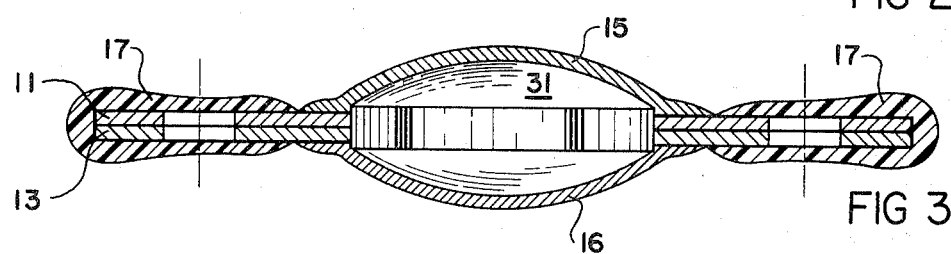
FIG. 3 is a cross-sectional view, similar to that of FIG. 2, taken after the plating step.

FIGS. 1, 2 and 3 illustrate one of the preferred embodiments according to the invention.

Two plates, for example metal plates, 11 and 13, of approximately the same size, although they may equally well be of different sizes and thicknesses, are clamped or otherwise held together, and two or more holes, for example holes 21 and 23, are drilled or bored through them. The diameter of these holes is such that precision pins or shafts of appropriate diameter may be slipped through them in a relatively close fit, to make possible a perfect realignment after the plates are separated.

The surfaces of these two plates 11 and 13 facing one another, must be as smooth and flat as possible, for reasons that it will become apparent in the ensuing description.

Assuming that, for illustrative purposes, numeral 31 designates the lens of which an exact mold must be made according to the teachings of the invention, a hole is drilled, bored or otherwise pierced through the two plates 11 and 13, while they are still held together, the diameter of this hole being of substantially the same order of magnitude as that of the lens 31, so that the lens 31 can snuggly fit in it, and thus held by the two plates 11 and 13, in the manner illustrated in the cross-sectional view of FIG. 2.

A thin metallic layer or coating is then sprayed, deposited or otherwise applied over the assembly, in order to render it electrically conducting, in preparation for the electroplating. It is convenient and economical to limit the plating (for example, the electroplating), in the desired areas, and therefore it is advisable to dip, coat or otherwise cover the rest of the assembly with an electrically non-conducting material, as shown for illustrative purposes by layers 17 in FIG. 3.

The assembly is now ready for plating, which may be of the electric or electroless type, although electroplating appears to have advantages and therefore may be preferable. The thickness of the plating depends entirely on the manufacturing requirements, such as strength, and may therefore vary accordingly. FIG. 3 is a cross-section similar to that of FIG. 2, but after the abovedescribed plating process, the plating layers surrounding the lens 31 designated by numerals 15 and 16. The non-conducting layers 17 may now be removed, the plates 11 and 13 separated and the lens 31 withdrawn. It is now evident that the plating layer 15 firmly adheres on plate 11, while plating layer 16 adheres similarly on plate 13. When the plates 11 and 13 are brought together again, a cavity having exactly the shape and size of the lens 31 will exist between them. In order to ensure a perfect matching of the plates, as to concentricity, and if required, as to azimuthal orientation, the above referred pins or shafts may be inserted through the alignment holes, such as holes 21 and 23.

Since the plating follows even the most minute details of lens 31, the mold cavity thus produced is an absolutely accurate enantiomorphic replica of the lens itself, and the mold thus produced may very conveniently be used for casting or molding any number of lenses using the desired plastic, glass or other material and the usual casting and molding processes and machines. It is of course evident that in order to cast or inject the desired plastic or other material the usual gates and overflow canals must be machined, as well as ejection-pin holes and the like. It must be noted that these gates, canals and other molding facilities may be also conveniently fabricated during the plating process by plating over appropriate patterns.

The two halfs of the mold thus produced may be mounted in the usual casting or molding machines and since the parts of this mold, as fabricated by the above described plating process, bulge over the flat surfaces of the plates 11 and 13, appropriate reliefs must be provided in the molding machines, or, alternatively, each of the two half-molds must be mounted on the molding machine by means of spacers secured to the flat portions of the plates 11 and 13. When this is not possible, or is not convenient, a method along the lines of Embodiment No. 2 may be followed.

EMBODIMENT No. 2

This embodiment of the invention is particularly suitable for use in molding or casting machines requiring a substantially flat surface for each part of the mold facing the molding or casting machine. It also provides substantially more rigid molds and is therefore particularly suitable for use with high-pressure injection-molding or casting techniques. Otherwise it is essentially similar to the previously described Embodiment No. 1.

Figure 4:
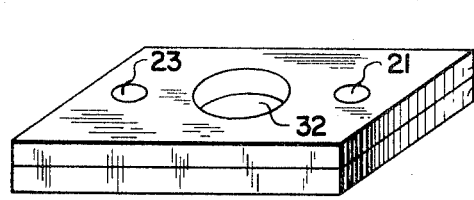
FIG. 4 is a perspective view of two typical plates employed in another preferred embodiment of the invention.
Figure 6:
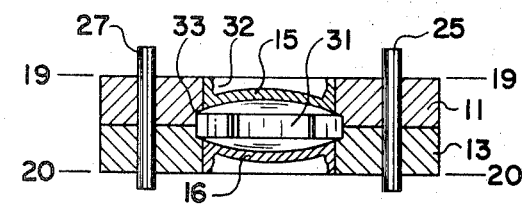
FIG. 6 is a cross-sectional view taken along line 6—6 of FIG. 5, but after the plating step.
Figure 5:
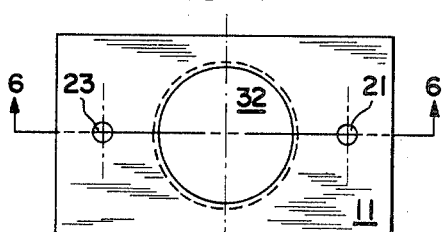
FIG. 5 is a plan view of the plates illustrated in FIG. 4.

Referring to FIGS. 4, 5 and 6, numerals 11 and 13 again designate two plates, but in this case, these two plates 11 and 13 are of substantial thickness. While the plates 11 and 13 are clamped or otherwise held together, the alignment holes 21 and 23 are machined through them.

Similarly, hole 32 is again machined through the two plates, but it is convenient (although not absolutely essential) that the diameter of this hole 32 be somewhat smaller than that of lens 31. The two plates 11 and 13 are now separated and one of them, or both of them, have the rim of their holes near the surfaces facing one another enlarged in such a fashion, and to such shape and dimension, that will ensure a firm support and containment of lens 31, for example a circular recess or step 33 following the contour of the lens 31 may be machined in one or both plates 11 and 13 in the manner illustrated in the cross-sectional FIG. 6. After covering all parts of the plates, except hole 32, with a protective or non-conducting layer (in the method described in Embodiment No. 1), plating or electroplating follows, producing the layers 15 and 16 (FIG. 6), which closely follow the contours of the lens 31 and firmly adhere to the walls of hole 32. Thus after separation of these plates 11 and 13 and removal of the lens 31, a rigid mold is produced, substantially similar to that illustrated in the previously described FIG. 3, but possessing considerably more strength and also having surfaces 19—19 and 20—20 perfectly flat (or of whatever other shape is desired for better or more convenient use with the casting or molding machine and technique employed).

The larger thickness of these plates offers a better and more convenient medium for the machining of molding gates, canals, ejection-pin holes, and similar molding and casting facilities and means.

In the manner previously described in connection with Embodiment No. 1, alignment pins, such as pins or shafts 25 and 27, may be conveniently inserted in alignment holes, such as holes 21 and 23, to ensure proper alignment, concentricity and — if required — azimuthal orientation of the two half-molds.

EMBODIMENT No. 3

In the above described Embodiments No. 1 and No. 2, it has been assumed that a mold of a relatively simple form had to be produced, namely a mold of the relatively simple lens 31. But this was only done to facilitate the description, and it is evident that molds of optical, or other parts, of complex shapes may equally well be made according to the teachings of the invention. In such cases, it has been found that it is sometimes difficult to separate the plates, such as plates 11 and 13, after the plating process, especially if some plating occurs between the two plates, thus bonding them together. Although this bonding can usually be prevented by using parting agents and careful preparation of the plates prior to plating, where it is feared that separation of the plates may be difficult, the method of Embodiment No. 3 is indicated:

The initial preparation of the plates prior to plating is in this case similar to that described in Embodiment No. 1 or No. 2, but the plating process is carried out in two or more steps. For example, if two steps are sufficient, the plates may be prepared in the manner illustrated in FIGS. 4 and 5 and previously described in connection with Embodiment No. 2. The two plates 11 and 13 are then separated, and referring now specifically to FIG. 7, lens 31 is fitted into the recess of hole 32 of plate 11 only. A protective or non-conducting layer 17 is then applied over plate 11 and over the exposed surface 35 of lens 31. Care is exercised to leave the other surface of the lens and the internal walls of hole 32 free of any protecting or non-conducting layer. The surface of the lens facing the hole 32 is covered by a thin conducting coating (if electroplating is used) and the walls of the hole 32 and the surface of the lens facing this hole are plated, thus forming plating layer 15, which follows the contour of one lens surface only and also firmly adheres to the walls of hole 32. The protecting layer 17 is then removed, the lens 31 withdrawn, and fitted in the recess of the other plate 13, with its surface 35 inside the hole. A preliminary preparation and plating follows in the abovedescribed manner, after which, the lens is again withdrawn. The two half-molds may now be carefully cleaned and polished, removing any plating burrs and thereafter machining gates, ejection-pin holes, etc. (of course the machining or forming of gates, ejection-pin holes and other means and facilities necessary for the molding or casting process may equally well precede the plating step, or may be formed by the plating process, as abovementioned). The two half molds may then be aligned by means of pins or shafts, such as pins 25 and 27 passing through holes 21 and 23, and fastened on the molding or casting machine.

Figure 7:
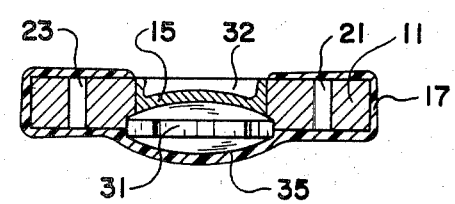
FIG. 7 is a cross-sectional view, similar to that illustrated in FIG. 6, but illustrating still another preferred embodiment of the invention.

It is evident that the plates 11 and 13 need not be thick as illustrated in FIG. 7, but thin plates, such as those described in connection with Embodiment No. 1 and illustrated in FIGS. 1, 2 and 3, may equally well be used according to the teachings of Embodiment No. 3.

NOTES AND COMMENTS

Since a plating follows the plated part or pattern to its most minute details, the preparation of molds according to the teachings of this invention is particularly well suited to the economical, mass-production of optical lenses, optical parts in general such as prisms and the like, and other precision parts and components whether they are for optical or other uses and whether they are metallic or non-metallic.

In its simplest form, two half molds suffice, and therefore the preparation of two half-molds was described and illustrated. But as already stated, in order to mold or cast complex parts and components, more than two half-molds may be indicated, and therefore the teachings of this invention may equally well apply in such cases. Equally well, for the casting or molding of simple parts, only one mold may suffice, for example one simple mold of substantially the form of FIG. 7 or equivalent.

The molds thus produced according to the teachings of the invention, may be used for molding or casting plastic parts, such as lenses and prisms, but also for casting metal parts or glass, such as casting glass lenses and prisms.

It must be noted that the manufacturing of precision lenses, prisms and optical parts in general, is an expensive and time-consuming process, requiring, in addition, great skill. But once the initial part or prototype is fabricated by using the precision techniques utilized in the optical industry, this first part may be used as a "pattern" for the preparation of molds according to the teachings of this invention, and from these molds, any number of duplicates may be conveniently and economically mass-produced.

For illustrative purposes the Figures illustrate steps in mold-making for lenses. Since lenses are made of glass or plastics it has been mentioned in the description that the surface of the lens is prepared for the plating step by first rendering it electrically conductive by spraying, coating or depositing thereon a thin conducting or metallic layer. A pattern for a lens or any other part may also be made of wood or plastic material, and again it may be prepared for the plating step by first rendering it conductive in the above-described manner. On the other hand, if a metallic pattern is employed according to the teachings of this invention, it may be necessary to first apply thereon a parting, isolating layer, and thereafter applying, if necessary, the abovedescribed electrically conductive layer. At any rate, the steps for preparing an object for plating and the plating techniques per se are well known in the art, and need not be described here.

The cavity behind the plating layer, for example the cavity behind plating layer 15 in hole 32 of FIG. 6, may optionally be filled with any desired material, such as plastic, metal etc., in order to fill the space and increase the overall strength of the mold.

It has been mentioned that for realigning the plates after they have been separated, holes, such as holes 21 and 23, are made through them and pins or shafts, such as 25 and 27, are inserted in them. The size and shapes of these holes and shafts may vary according to need, and any type of registration apertures in the plates and any type of corresponding inserts may be employed for alignment purposes. For example, the shafts employed may be precision ground posts or pins.

The invention was described by using three different embodiments thereof but, as already previously emphasized, this was only done for illustrative purposes and the principle and teachings of the invention may be applied by those skilled in the art by employing modifications and variations of the abovedescribed embodiments, all within the spirit of the invention.

What is claimed is:

1. A mold-making method according to which:
    a. In at least one plate a hole is made, said hole having a shape that closely follows a chosen contour of the pattern of the desired mold-cavity,
    b. said pattern is nested along said contour into said hole,
    c. the combination of (b) above is plated with a plating, and thereafter said pattern is withdrawn, the combination of said plating and said plate forming an enantiomorphic to said pattern mold-cavity.

2. A mold-making method according to which:
    a. Two plates are firmly held together and a hole is made through both of them, said hole having a shape that closely follows a chosen contour of the pattern of the desired mold-cavity,
    b. said pattern is nested into said hole,
    c. said two plates with said pattern nested into said hole are plated, and thereafter said two plates are separated and said pattern withdrawn, thus leaving between said two plates an enantiomorphic to said pattern mold-cavity.

3. The method of claim 2, in which said firmly held together two plates of step (a) are provided with registration apertures.

4. The method of claim 3, in which said two plates, after their separation according to step (c), are realigned by means of precision-ground guiding posts inserted through said registration apertures.

5. The method of claim 2, in which more than two plates are employed.

6. The method of claim 5, in which said plates are provided with registration apertures through which precision-ground posts are inserted in order to ensure their correct realignment after they have been separated.

7. A mold-making method according to which:
 a. Two plates are firmly held together and a hole is made through both of them, said hole having a shape that closely follows a chosen contour of a pattern employed in making a desired mold-cavity,
 b. said two plates are separated,
 c. said pattern is nested along said contour into said hole of one of said plates, the nested pattern having thus two exposed surfaces, and one of said two surfaces is covered with a protective non-plating layer, leaving a non-covered surface,
 d. the combination of (c) above is plated and thereafter said layer is removed and said pattern is withdrawn thus leaving an enantiomorphic to said non-covered surface mold-cavity,
 e. said pattern is nested along said contour into said hole of the other of said two plates, the nested pattern having thus two exposed surfaces, and one of said two surfaces is covered with said protective non-plating layer, leaving a second non-covered surface,
 f. the combination of (e) above is plated and thereafter said layer is removed and said pattern is withdrawn thus leaving an enantiomorphic to said second non-covered surface mold-cavity,
 g. said two plates with their mold-cavities as produced by steps (d) and (f) above are brought together again and aligned to form between them a final single mold-cavity.

8. The method of claim 7, in which more than two plates are employed.

9. The method of claim 8, in which said plates are provided with registration apertures through which precision-ground posts are inserted in order to ensure their correct realignment after they have been separated.

10. The method of claim 7, in which said firmly held together two plates of step (a) are provided with registration apertures to ensure their correct alignment as per step (g).

11. The method of claim 7 in which at least one of said protective layer of step (c) and said protective layer of step (e) is extended over the side of said plate which is next to said covered surface.

12. A mold-making method according to which:
 a. A hole is made through a plate, said hole having a shape that closely follows a chosen contour of the pattern of the desired mold-cavity,
 b. said pattern is nested along said contour into said hole of said plate, the nested pattern having thus two exposed surfaces, and one of said two surfaces is covered with a protective non-plating layer, leaving a non-covered surface,
 c. the combination of (b) above is plated and thereafter said layer is removed and said pattern is withdrawn thus leaving an enantiomorphic to said non-covered surface mold-cavity.

\* \* \* \* \*